Patented June 4, 1929.

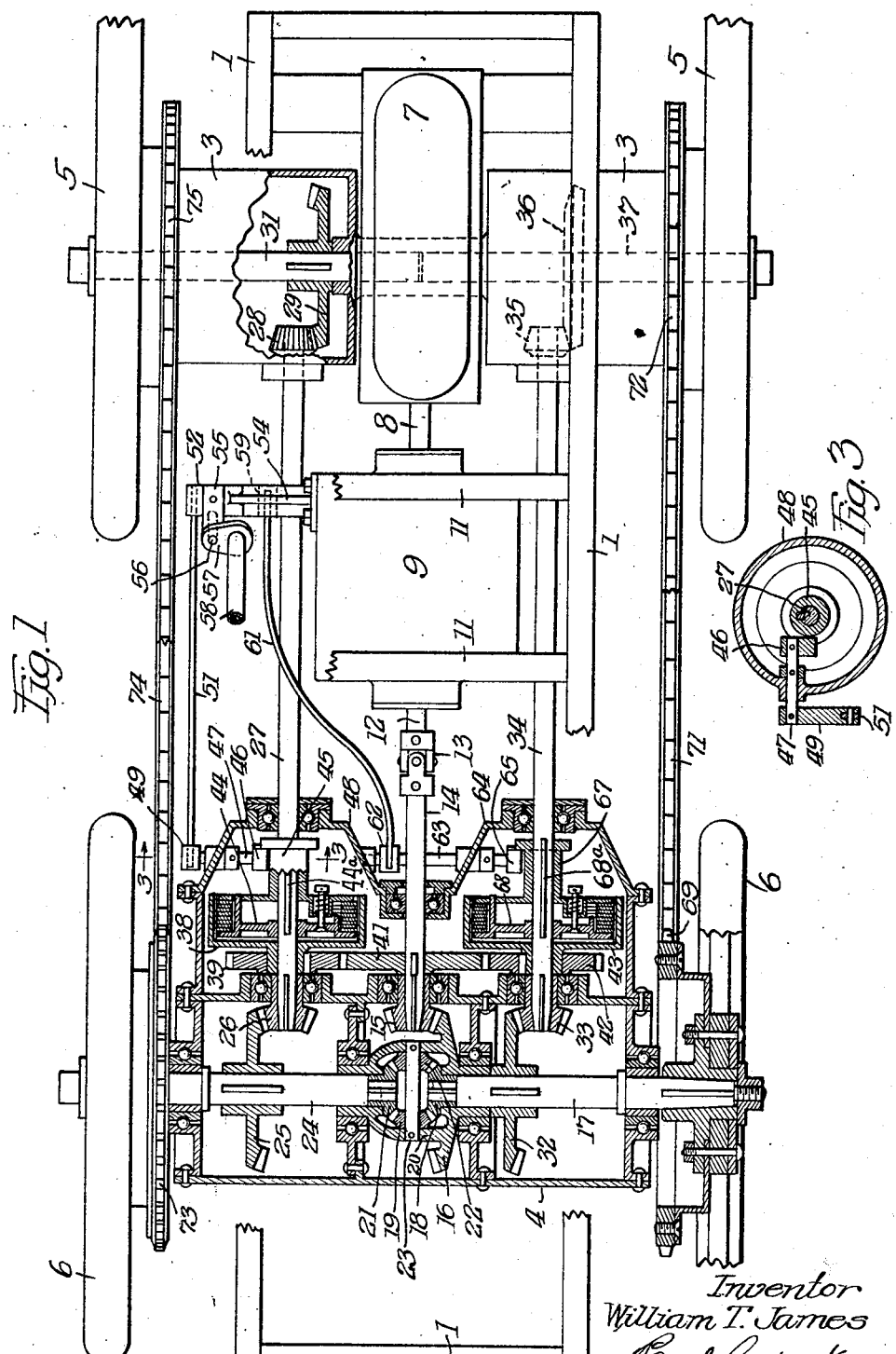

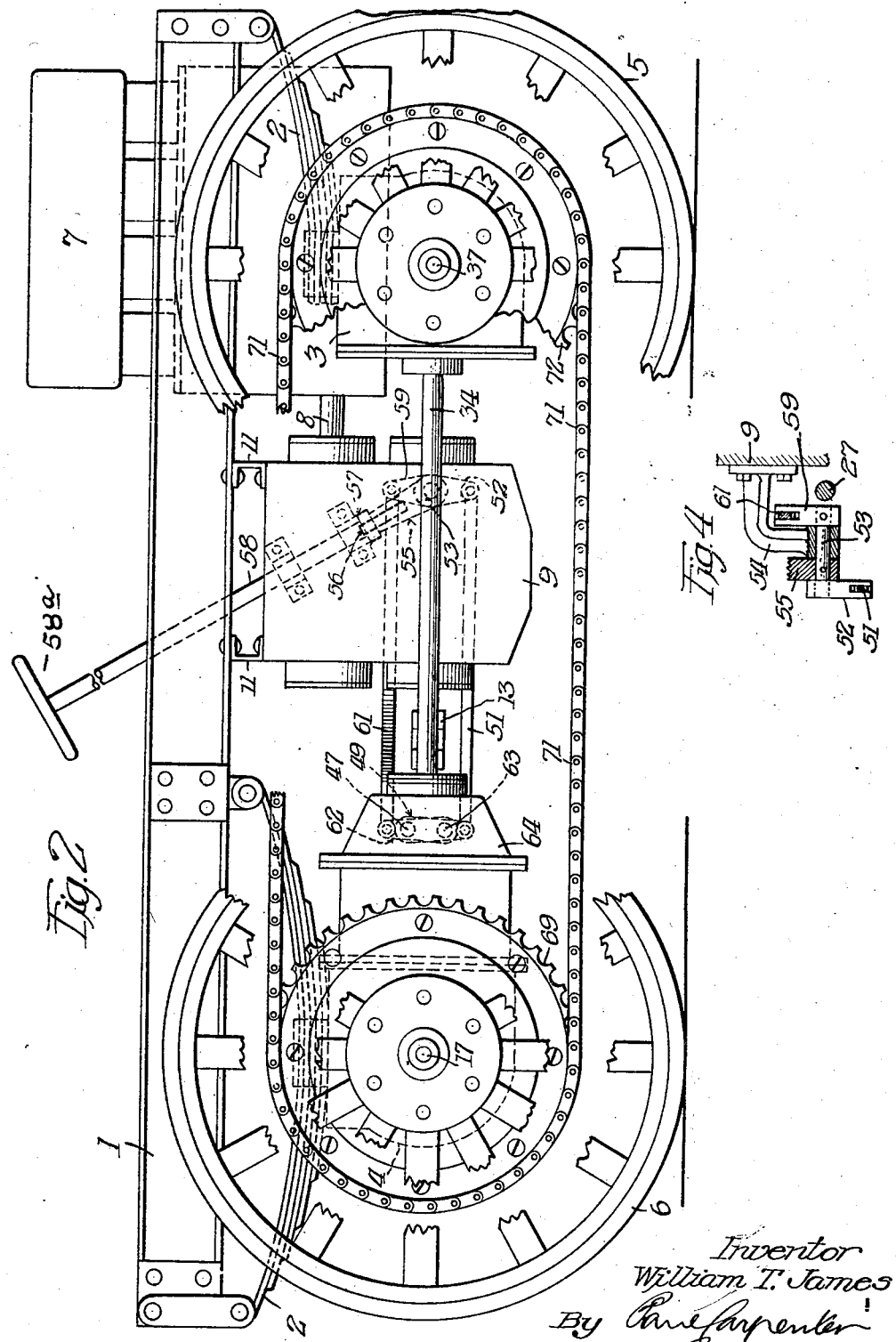

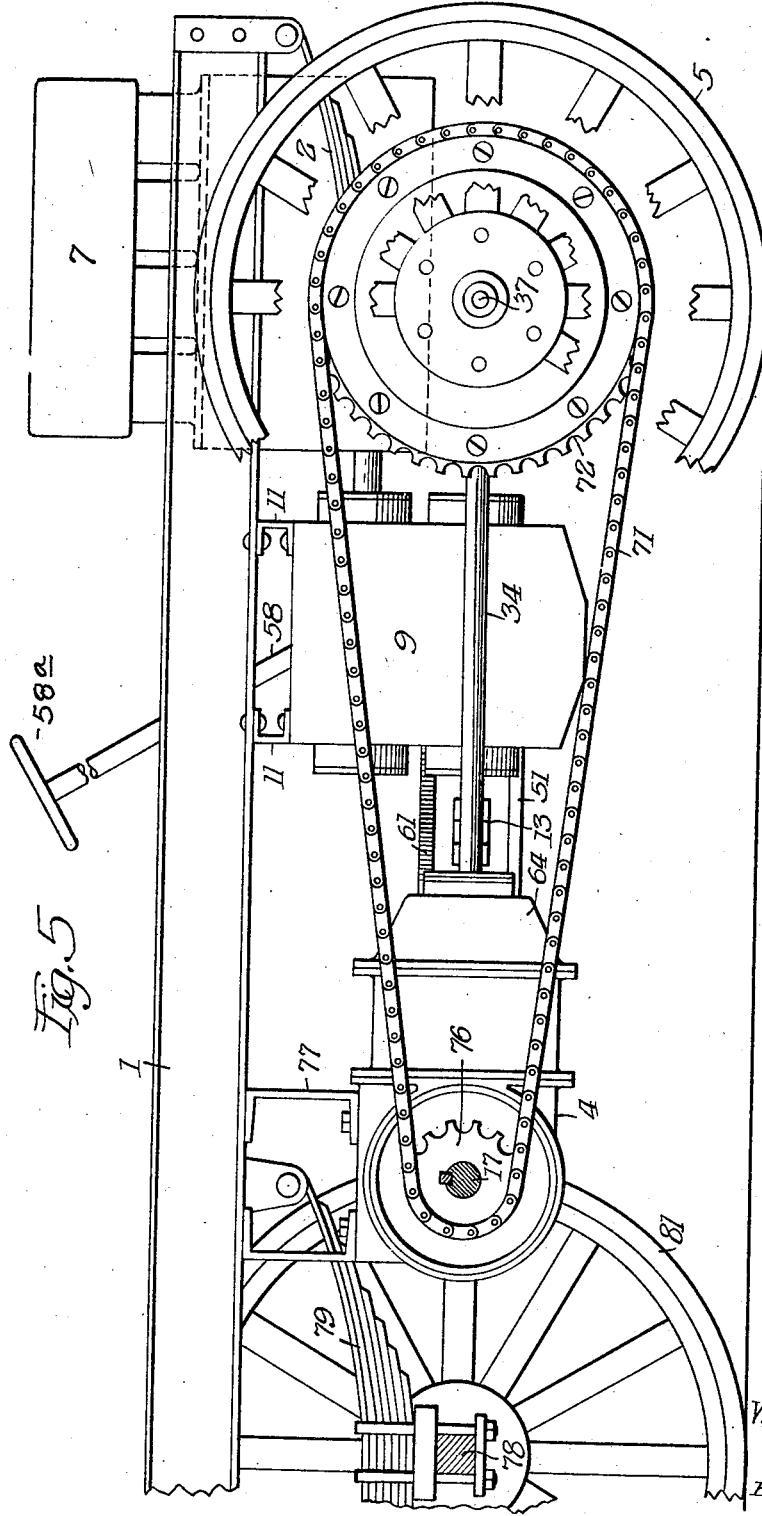

UNITED STATES PATENT OFFICE.

1,715,503

WILLIAM T. JAMES, OF CHICAGO, ILLINOIS.

TRACTOR.

Application filed November 27, 1918. Serial No. 264,303.

My present invention relates in general to automotive vehicles, more particularly to self-contained prime movers used for purposes of traction, and has special reference to the provision of a novel and improved type of vehicle especially adapted for work on uneven or yielding surfaces such as roadways or soft or ploughed fields.

The principal objects of my present invention are broadly the provision of improved driving vehicle mechanism whereby skidding or slippage is avoided; means for positively driving both of the rear wheels of a vehicle; the provision of means whereby the vehicle may be steered by means of the method of driving the driving wheels; the provision of means whereby the vehicle may be steered through differential actuation of the driving wheels; the provision of an improved form of steering mechanism in a vehicle employing differential gearing whereby it may be turned through the employment of certain auxiliaries to differential gearing or similar compensatory device the provision of an improved form of vehicle characterized by the fact that all of the vehicle wheels are maintained in predetermined position and that none of them are moved laterally relatively to any of the others in changing the course of the vehicle, and more specifically the provision of improved means for driving all of the wheels of a vehicle, the provision in automotive vehicles of driving means wherein is employed a rigid front axle, the provision of means for eliminating actual manual turning of the driving wheels, the provision of driving mechanism for vehicles including means for driving one side of the vehicle at a different rate of speed from the other side but actuating all of the wheels to be driven; the provision of means whereby the driving wheels on one side of the vehicle may be driven in unison; the provision of means whereby one lateral pair of wheels may be driven in unison at a different or with the same peripheral rate of speed as the other lateral pair; the provision of means for attaining any desired turning radius with an equal travel of the steering wheels; the provision of means for steering a vehicle through clutch manipulation; the provision of improved means for driving the front wheels directly from the same source of power as the rear wheels; the provision of means for driving the front wheels of a vehicle from the same differential or compensatory gearing as the rear wheels, together with such other objects as may hereinafter appear.

In attaining the objects referred to, together with certain additional benefits and advantages to be below pointed out, I have provided a construction, one embodiment whereof in the form of a road or field tractor is disclosed in the accompanying drawings wherein:

Figure 1 is a plan view, partly in horizontal section, illustrative of a vehicle embodying my present improvements;

Figure 2 is a side elevational view of the structure of Figure 1, certain of the parts being broken away;

Figure 3 is a fragmentary view, partly in vertical section, of a detail of construction, the same being taken on the line 3—3 in Figure 1 and viewing the parts in the direction indicated by the arrow;

Figure 4 is a fragmentary view, partly in vertical section, of a detail of construction, certain of the elements of which are to be seen in Figure 2;

Figure 5 is a side elevational view in certain respects similar to Figure 2, illustrative of a modified form of construction.

Referring first more particularly to Figure 1, wherein the details of the power driving mechanism, with the drive connections from the rear to the front of the vehicle, are perhaps more clearly shown, it will be observed that I employ in the chassis frame members indicated at 1, a divided front axle structure comprising coaxial revoluble elements 31 and 37, a divided rear axle structure comprising revoluble coaxial elements 17 and 24, the front axle elements having fixed against relative rotation thereon traction wheels 5 and the rear axle elements being similarly provided with traction wheels 6.

The front axle and the driving mechanism therefor is enclosed in a housing 3 and the rear axle and the driving mechanism is enclosed in a housing 4, the chassis 1 being supported upon said housings by means of springs 2.

The housing 3 is reduced in size between its ends to provide space and clearance for the motor 7 which may be an internal combustion engine and is the prime mover of the vehicle, delivering its motive power through the shaft 8 and speed change gearing disposed in the housing 9 which is supported by transverse beams 11 from the chassis frame members.

The speed change gearing may be of any suitable type preferably such for example as the one disclosed in my co-pending application for patent Serial No. 188,950 wherein I employ two shafts disposed in the same vertical plane, the lower one 12 being adapted to drive a propeller shaft 14 through a universal joint or other suitable flexible coupling.

The shaft 14 is provided with a pinion 15 for driving the differential gearing and also with a spur gear 41 for actuating the auxiliary and compensatory gearing for actuating the combined rear and front wheel drive shafts in a manner to be below more fully described.

The bevel pinion at 15 is arranged to drive the bevel gear 16 formed on the differential gear housing 20 which supports a shaft 23 at the ends of which are disposed bevel gears 19 and 22 for driving the bevel gears 21 and 18 and the rear axle shafts 24 and 17.

The shafts 24 and 17 are provided with bevel gears 25 and 32 meshing with pinions 26 and 33 on the shafts 27 and 34 which carry spur gears 39 and 42 engaging the spur gear 41 whereby I provide means for driving said axle elements 24 and 17 at different speeds, independently, and controlled relatively to each other through the gears in the differential housing 20.

For controlling the driving effect of the gears 39 and 42, they are carried on clutch drum elements 38 and 43 freely revoluble on the shafts 27 and 34. For positively driving the drums 38 and 43, the shafts 27 and 34 engage multiple-disc supporting members 44 and 68 by means of keys 44$^a$ and 68$^a$ and the customary sliding sleeves 45 and 67 which latter actuate the discs and in turn are actuated by elements 46 and 65 non-rotatably mounted on the transverse shafts 47 and 63 which are supported by housings 48 and 64. Lever arms 49 and 62 mounted on the shafts 47 and 63 respectively are connected by means of actuating rods 51 and 61 to actuating arms 52 and 59 on a shaft 53 carried in a bracket 54 supported by the speed change gearing housing 9. The shaft 53 has a controlling arm 55 operable by a crank arm 57 on the steering post 58 which may be rotated by the steering wheel 58$^a$, a flexible connection between the arms 55 and 57 being established by the sliding pin 56.

At the forward end of the vehicle, the shafts 27 and 34 are provided with bevel gears 28 and 35 respectively meshing with gears 29 and 36 fixed on the shafts 31 and 37 which are thereby driven in unison and caused to revolve simultaneously with the shafts 24 and 17 respectively at all times.

On examination of Figure 1, it will be noted that the front and rear wheels, 5 and 6 respectively, on each side are connected by chains 71 and 74 and on inspection of Figure 2, it will appear that the wheels 5 and 6 are of the same size and sprockets 69 and 72 which the chains engage are likewise of the same size.

Furthermore, it will be apparent on inspection of Figure 1 that the gears 25 and 29 and pinions 26 and 28 are of the same proportional sizes, and that the gears 32 and 36 and pinions 33 and 35 are of the same proportional sizes so that when the shafts 27 and 34 are driven, each lateral pair of wheels 5 and 6 are driven at the same rate of speed.

Referring now more particularly to Figure 5, it will be observed that I have here shown a modified form of construction wherein sprockets such as are indicated at 76 are mounted on the shafts 17 and 24 (in lieu of rear wheels 6) and that the vehicle is supported by rear wheels 81 mounted on a stationary axle 78 which sustains the chassis by means of springs 79. In this construction the differential housing 4 instead of being supported directly by the wheels, is supported from the chassis 1 by beams 77.

From the foregoing description, referring first more particularly to the construction of Figures 1 to 4, it will be apparent that while the rear axle structure is driven through a differential gearing in the customary manner, the rear axle elements 24 and 17 are also positively driven through the auxiliary propeller shafts 27 and 34 respectively when the clutch mechanisms 38 and 43 respectively are operated, and that at all times by virtue of the driving chains 71 and 74 the lateral pairs of front and rear wheels, on the right and left hand side of the vehicle respectively are driven simultaneously and in unison when the vehicle is proceeding in a straight line. When, however, it is desired to drive the vehicle on a curvilinear path, say to the right, the steering wheel 58$^a$ is turned to the right, clutch 38 is operated and by virtue of the construction above described, the clutch 43 is released, to the end that power is delivered to that one of the auxiliary shafts which is indicated at 27. This procedure drives the left-hand side of the vehicle at a more rapid rate of speed than the right-hand side, even though power is still delivered through the shaft 14. When, however, it is desired to turn the course of the vehicle to the left, the converse operation of the clutches is carried out.

From the foregoing description, it will further be evident that the entire steering is performed by applying power to that lateral pair of wheels which is on the side of the vehicle opposite to that to which it is desired to turn the vehicle, the turning being accomplished through the relative over-running, by the pair of wheels to which power is applied, of the other pair of wheels, the difference in the length of the various paths of movement in excess of that predetermined by the gearing ratios being compensated for by clutch slippage. It will further be apparent that by virtue of the facts that each lateral pair of wheels is positively driven and that each transverse pair of wheels may be positively driven, liability to skidding or slipping is largely obviated.

Having thus described my invention and illustrated its use, what I claim as new and desire to secure by Letters Patent is the following:

1. In an automotive vehicle, driving mechanism including pairs of front and rear traction wheels, an axle for one pair of wheels, and gearing for positively driving the several wheels in unison, a prime mover and a single propeller shaft for driving the said gearing simultaneously directly from said prime mover and indirectly through said axle.

2. In an automobile vehicle, in combination, front and rear wheels, divided front and rear axles for supporting said front and rear wheels, differential gearing for driving said rear axle, means connecting the front and rear axles for causing the same to revolve at the same speed, and auxiliary means positively and directly driving one portion of each of said axles through said connecting means.

3. In an automobile vehicle, in combination, front and rear wheels, divided front and rear axles for supporting said front and rear wheels, differential gearing for driving said rear axle, means connecting the front and rear axles for causing the same to revolve at the same speed, and auxiliary means including clutch elements for positively and directly driving one portion of each of said axles through said connecting means.

4. In an automotive vehicle, front and rear wheels, divided axles for supporting said front and rear wheels, a prime mover, means connecting said axles for driving the same in unison, a differential gearing for said axle actuated by said prime mover, an auxiliary driving mechanism, including a clutch mechanism, actuated from said prime mover for driving the several parts of the divided axles directly through said connecting means independently of the differential gearing, and compensating gearing including means for decelerating the speed of one part and accelerating the speed of the other part whereby the speed of the decelerated part is in direct ratio to the accelerated speed of the other part.

5. In an automobile vehicle, in combination, front and rear wheels, and means for connecting said wheels for driving the same in unison, a propeller shaft driving the rear wheels, through a differential connected to one pair of wheels, and auxiliary driving means directly connecting said propeller shaft with said connecting means for driving said wheels independently of said differential.

6. In an automobile vehicle, in combination, front and rear wheels, and connecting means for said wheels for driving the same in unison, divided axles for supporting said front and rear wheels, a prime mover, a differential gearing for one of said axles actuated by said prime mover, and an auxiliary driving mechanism, including a clutch mechainsm, actuated from said prime mover for driving the several parts of all of said divided axles independently of said differential gearing, said auxiliary drive adapted to act on either of the parts of each of said divided axles through said connecting means independently of the other parts.

7. In an automotive vehicle, front and rear wheels, divided front and rear axles, a prime mover, driving connections which include clutch mechanisms severally arranged between the prime mover and the axles, and a steering wheel connected to all of said clutch mechanisms for operating said clutch mechanisms in alternation.

8. In an automobile vehicle, in combination, front and rear divided axles having pairs of wheels supported thereon, a prime mover, a propeller shaft connected to the sections of one of said axles through differential ratio gearing, a positive means connecting the complemental sections of said axles, a clutch mechanism associated therewith, and gearing connecting said propeller shaft with said means for independently driving the axles of lateral pairs of wheels at different speeds upon actuation of said clutches.

9. In an automotive vehicle, two pairs of driving wheels adjacent to the sides of the vehicle, a steering device, live shafts for said wheels independently and jointly operable differential and compensatory gearing driving said driving wheels, and means actuated by and associated with the steering device for positively connecting and disconnecting said compensatory gearing with one or the other of said pairs of driving wheels for driving the same directly through said live shafts irrespective of said differential gearing.

10. In an automotive vehicle, two pairs of driving wheels adjacent to the sides of the vehicle, a steering device, independently and jointly operable differential and compensatory gearing driving said driving wheels, means including said steering device connecting said compensatory gearing alternately with one or the other of said pairs of driving wheels upon actuation of said steering device, and means for normally positively connecting said steering elements for driving the same in unison.

11. In an automotive vehicle, a propeller shaft, front and rear pairs of traction wheels, a live shaft arranged transversely of the vehicle and carrying a pair of said wheels, speed change gearing for driving said live shaft from said propeller shaft at a predetermined ratio of speed with respect to said propeller shaft, and auxiliary means for positively driving said other pair of wheels from said propeller shaft directly and positively through said live shaft irrespective of said gearing.

12. In an automotive vehicle, a propeller shaft, front and rear pairs of traction wheels, a differential live shaft arranged transversely of the vehicle and carrying a pair of said wheels, speed change gearing for driving said differential shaft at a predetermined ratio of speed with respect to said propeller shaft, said live shaft composed of two sections, gears splined to each section, auxiliary drive shafts extending from said gears and provided with means operatively connecting them with said other pair of wheels, a spur gear splined on said propeller shaft, clutches on said auxiliary shafts, means on said clutches operatively engaging said spur gear.

In testimony whereof I have hereunto signed my name.

WILLIAM T. JAMES.